(12) United States Patent
Krolo et al.

(10) Patent No.: US 11,932,106 B2
(45) Date of Patent: Mar. 19, 2024

(54) WORK MACHINE

(71) Applicant: HONDA MOTOR CO., LTD., Tokyo (JP)

(72) Inventors: Ante Krolo, Wako (JP); Mengguang Li, Wako (JP); Junichi Eguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 493 days.

(21) Appl. No.: 17/189,513

(22) Filed: Mar. 2, 2021

(65) Prior Publication Data

US 2021/0276417 A1 Sep. 9, 2021

(30) Foreign Application Priority Data

Mar. 9, 2020 (JP) ................................ 2020-039908

(51) Int. Cl.
*B60K 26/02* (2006.01)
*B60K 1/04* (2019.01)
*B60L 50/60* (2019.01)

(52) U.S. Cl.
CPC ............ *B60K 26/02* (2013.01); *B60K 1/04* (2013.01); *B60L 50/60* (2019.02); *B60K 2001/0405* (2013.01)

(58) Field of Classification Search
CPC .. B60K 26/02; B60K 1/04; B60K 2001/0405; B60L 50/60

USPC ....................................................... 180/19.3
See application file for complete search history.

(56) References Cited

U.S. PATENT DOCUMENTS 11,622,502 B2 4/2023 Wei et al.
2018/0228089 A1* 8/2018 Yamaoka ........... A01D 34/6806
2020/0000030 A1 1/2020 Wei et al.

FOREIGN PATENT DOCUMENTS

JP S54-135346 U 9/1979
JP 2015097476 A * 5/2015

OTHER PUBLICATIONS

German Office Action for German Patent Application No. 102021105065.0 dated Oct. 24, 2023.

* cited by examiner

*Primary Examiner* — Mahmoud Gimie
(74) *Attorney, Agent, or Firm* — Thomas| Horstemeyer, LLP

(57) ABSTRACT

A work machine according to this invention includes a power source incorporated in a vehicle body, an extended portion extended from the vehicle body to form a grip portion and configured to be folded with respect to the vehicle body, a lock portion provided to lock the extended portion when the extended portion is folded with respect to the vehicle body, and an activation suppressing portion configured to suppress activation of the power source if the extended portion is locked by the lock portion.

7 Claims, 3 Drawing Sheets

WORK MACHINE

CROSS-REFERENCE TO RELATED APPLICATION(S)

This application claims priority to and the benefit of Japanese Patent Application No. 2020-039908 filed on Mar. 9, 2020, the entire disclosure of which is incorporated herein by reference.

BACKGROUND OF THE INVENTION

Field of the Invention

The present invention relates to a work machine.

Description of the Related Art

In some of work machines such as a lawn mower, a grip portion is provided on an extended portion extended from a vehicle body. The extended portion is made foldable with respect to the vehicle body, and if the work machine is not used, the extended portion is folded to store the work machine (Japanese Utility Model Application No. 53-29741).

It is thought that there is demand for further improvement in usability when storing the work machine.

SUMMARY OF THE INVENTION

It is an object of the present invention to improve usability when storing a work machine.

One of the aspects of the present invention provides a work machine, comprising a power source incorporated in a vehicle body, an extended portion extended from the vehicle body to form a grip portion and configured to be folded with respect to the vehicle body, a lock portion provided to lock the extended portion when the extended portion is folded with respect to the vehicle body, and an activation suppressing portion configured to suppress activation of the power source if the extended portion is locked by the lock portion.

Further features of the present invention will become apparent from the following description of exemplary embodiments (with reference to the attached drawings).

DESCRIPTION OF THE EMBODIMENTS

Figure 1A:
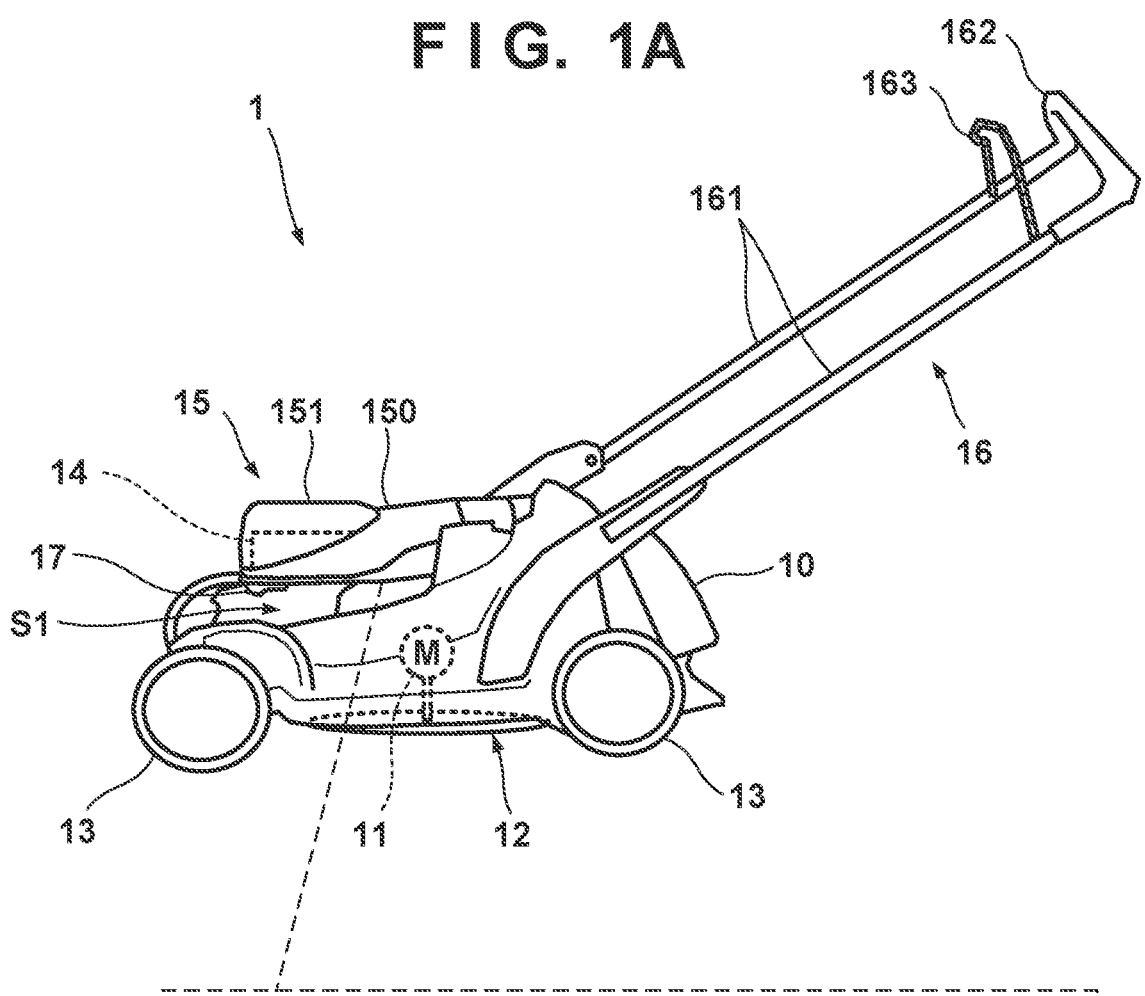
FIG. 1A is a schematic view showing a state in which a work machine according to an embodiment is usable.
Figure 1A:
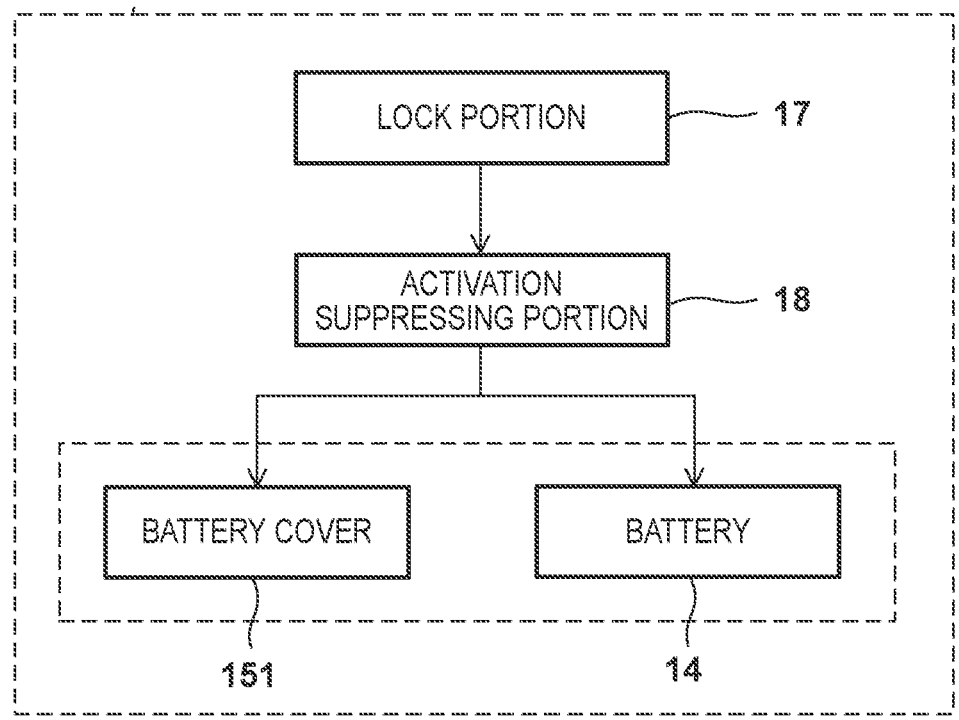

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1B:
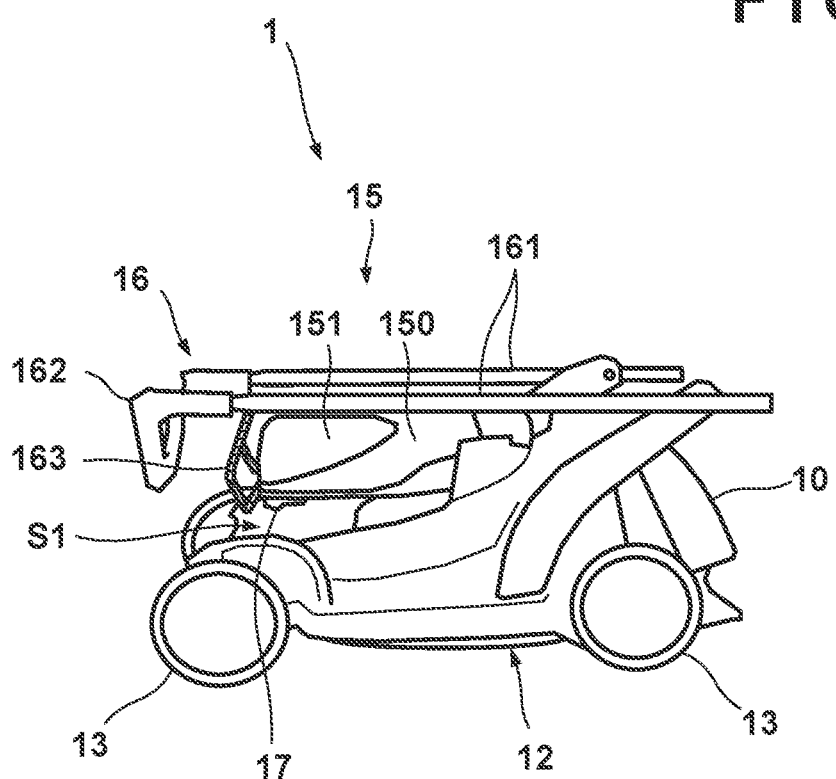
FIG. 1B is a schematic view showing a state in which the work machine can be stored.

FIGS. 1A and 1B are schematic views showing the overall arrangement of a work machine 1 according to an embodiment. FIG. 1A shows a state in which the work machine 1 is usable, and FIG. 1B shows a state in which the work machine 1 can be stored (a state in a case in which the work machine 1 is not used), as will be described later in detail.

The work machine 1 includes a power source 11, a work portion 12, a traveling portion 13, a battery 14, a battery case 15, an extended portion 16, a lock portion 17, and an activation suppressing portion 18.

The power source 11 is incorporated in a vehicle body 10, and generates power (rotation) to drive the work portion 12 and the traveling portion 13, as will be described later in detail. In this embodiment, an electric motor such as a three-phase induction motor is used as the power source 11, and the electric motor operates based on power from the battery 14 to be described later.

Note that in this embodiment, the single power source 11 is provided. As another embodiment, a power source configured to generate power to be transmitted to the work portion 12 and a power source configured to generate power to be transmitted to the traveling portion 13 may individually be provided. In this case, one power source may be an electric motor, and the other power source may be an internal combustion engine.

The work portion 12 is provided in the lower portion of the vehicle body 10, and configured to execute a predetermined work based on the power of the power source 11. In this embodiment, the work contents are lawn mowing works, and the work portion 12 includes a lawn mowing blade rotatable based on the power of the power source 11, and an elevating mechanism capable of moving the blade up and down. For example, when executing a work, the work portion 12 lowers the work blade and sets it in a rotation state (operating state). When a work is not to be executed, the work portion 12 raises the blade and sets it in a non-rotation state (inactive state).

The traveling portion 13 is provided to implement the traveling function of the work machine 1 based on the power of the power source 11, and in this embodiment, includes a pair of left and right rear wheels that are driving wheels, and a pair of left and right front wheels that are driven wheels. Note that the traveling portion 13 may employ another structure such as a crawler traveling body in place of the above-described structure capable of implementing four-wheel traveling.

The battery 14 is detachably attached to the vehicle body 10, and can supply power to the power source 11. As the battery 14, for example, a secondary battery such as a lithium ion battery or a lead storage battery can be used.

The battery case 15 is provided in the upper portion of the vehicle body 10 to store the battery 14. The battery case 15 is provided to be opened/closed with respect to the vehicle body 10, and may be discriminated into a case main body 150 and a cover 151 that can be opened/closed with respect to the case main body 150 from this viewpoint. The cover 151 is provided on the opposite side of the vehicle body 10 with respect to the case main body 150.

The extended portion 16 includes a pair of left and right rod-shaped members 161, a grip portion 162, and an operation portion 163. The pair of left and right rod-shaped members 161 are extended from both lateral sides of the vehicle body 10 to the upper rear side. The pair of left and right rod-shaped members 161 are connected to each other at a position apart from the vehicle body 10 (that is, the rear end portion), thereby forming the grip portion 162.

In addition, the operation portion 163 is a lever (for example, a clutch lever, a brake lever, or the like) used to perform driving control of the work portion 12 and/or traveling control of the traveling portion 13, and is provided near the grip portion 162 to pivot with respect to the grip portion 162. Hence, the user can perform driving control of the work portion 12 and/or traveling control of the traveling portion 13 by operating the operation portion 163 while gripping the grip portion 162.

The operation portion 163 is configured to individually control the work portion 12 and the traveling portion 13. For example, the user can set the work portion 12 in the operating state and the traveling portion 13 in the inactive state, or set the work portion 12 in the operating state and the traveling portion 13 in a traveling state (operating state). In this case, as the operation portion 163, a lever used to do driving control of the work portion 12 and a lever used to do traveling control of the traveling portion 13 need only individually be provided.

Although a detailed description will be omitted, a predetermined switch is provided on a side surface of the grip portion 162. In a state in which a key is inserted into the battery case 15, the user operates the operation portion 163 while pressing the switch (performs a so-called two-step operation), thereby performing driving control of the work portion 12 and/or traveling control of the traveling portion 13. It can be said that this arrangement is advantageous in improving safety in terms of operation.

Here, the pair of left and right rod-shaped members 161 are attached to pivot with respect to the vehicle body 10, and the extended portion 16 can thus be folded with respect to the vehicle body 10. A state in which the extended portion 16 is not folded with respect to the vehicle body 10 corresponds to a state in which the work machine 1 is usable (see FIG. 1A). A state in which the extended portion 16 is folded with respect to the vehicle body 10 corresponds to a state in which the work machine 1 can be stored (a state in a case in which the work machine 1 is not used) (see FIG. 1B).

The lock portion 17 is provided to lock the extended portion 16 when the extended portion 16 is folded with respect to the vehicle body 10. In this embodiment, a gap S1 is provided between the vehicle body 10 and the battery case 15, and the lock portion 17 is provided on the battery case 15 in the gap S1. The operation portion 163 of the extended portion 16 is locked by the lock portion 17, and the lock portion 17 is a push switch, as will be described later in detail.

The activation suppressing portion 18 is configured to suppress activation of the power source 11 when the extended portion 16 is locked by the lock portion 17. As one form, the activation suppressing portion 18 may block the power supply path (electric path) from the battery 14 to the power source 11. For example, when the extended portion 16 is locked by the lock portion 17, the activation suppressing portion 18 can eject the battery 14 from the battery case 15. Before this, the activation suppressing portion 18 sets the battery case 15 in an open state.

In a state in which the extended portion 16 is folded with respect to the vehicle body 10, the battery case 15 is located between the pair of left and right rod-shaped members 161. For this reason, opening of the battery case 15 and ejection of the battery 14 from the battery case 15 by the activation suppressing portion 18 can appropriately be implemented.

According to this arrangement, the user can perform a work by setting the work machine 1 in the state shown in FIG. 1A, setting the work portion 12 in the operating state, and making the work machine 1 travel while gripping the grip portion 162. From this viewpoint, the work machine 1 can also be called a walking type work machine, a hand work machine, or the like. When a work has ended, the user can store the work machine 1 in the state shown in FIG. 1B.

Figure 2A:
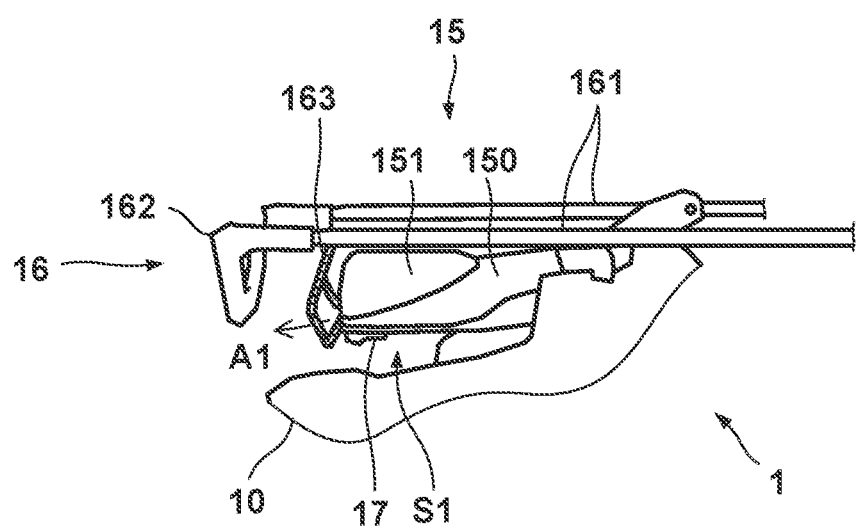
FIG. 2A is a schematic view showing a form when folding an extended portion.
Figure 2B:
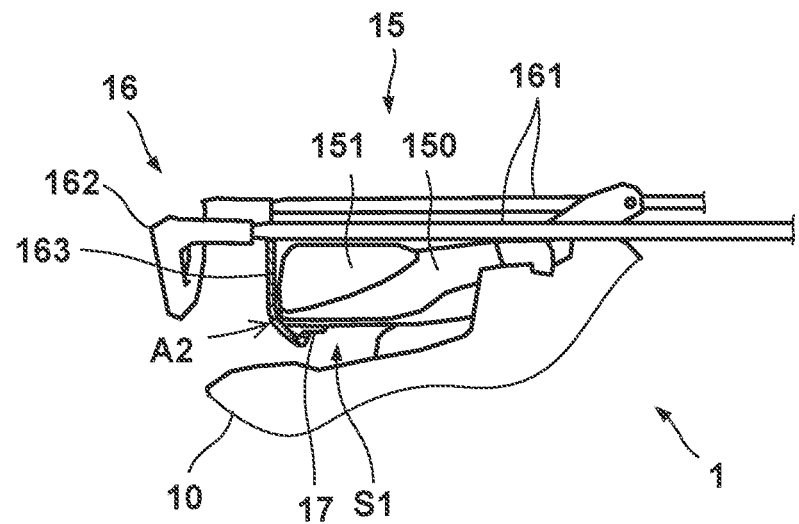
FIG. 2B is a schematic view showing a form when folding the extended portion.
Figure 2C:
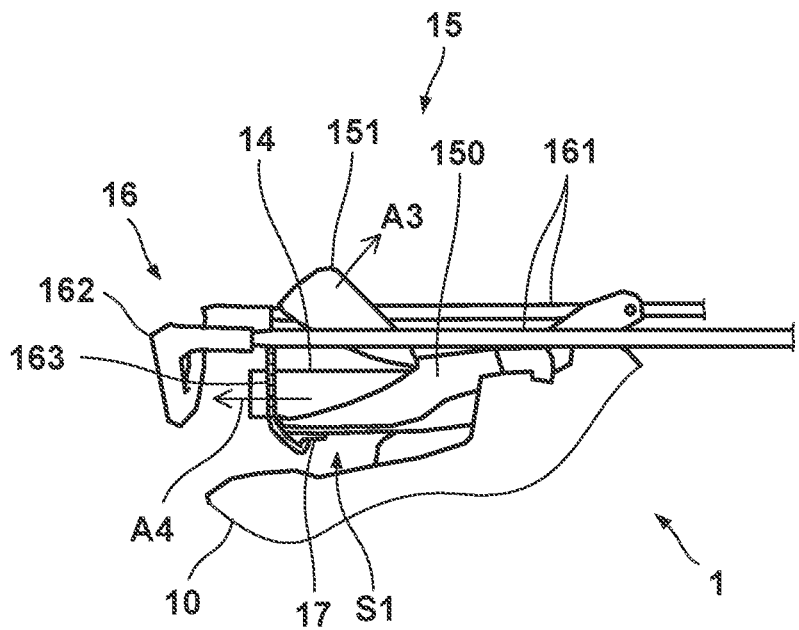
FIG. 2C is a schematic view showing a form when folding the extended portion.

FIGS. 2A to 2C are schematic views showing a form when folding the extended portion 16 with respect to the vehicle body 10.

First, in a step shown in FIG. 2A, the user folds the extended portion 16 with respect to the vehicle body 10, and makes the operation portion 163 pivot in a direction of moving close to the grip portion 162, as indicated by an arrow A1. The user can thus move the operation portion 163 to a position under the battery case 15 without making the operation portion 163 interfere with the battery case 15.

After that, in a step shown in FIG. 2B, the user returns the operation portion 163 to the original position (that is, makes the operation portion 163 pivot in a direction of separating from the grip portion 162), thereby making the operation portion 163 locked by the lock portion 17, as indicated by an arrow A2.

In accordance with the lock of the operation portion 163 by the lock portion 17, in a step shown in FIG. 2C, the activation suppressing portion 18 sets the battery case 15 in an open state, as indicated by an arrow A3. Accordingly, the battery 14 is ejected from the battery case 15, as indicated by an arrow A4. According to this, the user can appropriately detach the battery 14 from the vehicle body 10.

In this embodiment, a push switch is used as the lock portion 17, and the switch is pushed by the lock (or abutment). The activation suppressing portion 18 need only be formed by a known mechanical structure using, for example, a spring, a link mechanism, or the like, and thus sets the battery case 15 in an open state in accordance with push of the switch and ejects the battery 14 from the battery case 15. According to this arrangement, opening of the battery case 15 and ejection of the battery 14 when the extended portion 16 is folded with respect to the vehicle body 10 can be implemented by a relatively simple structure.

Conventionally, the user has been able to open the battery case 15 and eject the battery 14 by folding the extended portion 16 with respect to the vehicle body 10, and manually pushing the push switch serving as the lock portion 17. According to this embodiment, when the extended portion 16 is folded with respect to the vehicle body 10, opening of the battery case 15 and ejection of the battery 14 are implemented. Hence, any other mechanism configured to implement these need not be provided anew.

As another embodiment, in the step shown in FIG. 2A, the operation portion 163 may be made to pivot not by a manual operation of the user but by interference with the battery case 15. In this case, in the step shown in FIG. 2B, the operation portion 163 is returned to the original position. Additionally, in the step shown in FIG. 2C, the battery case 15 is set in the open state, and accordingly, the battery 14 is ejected from the battery case 15.

Note that the directions of the arrows A1 to A4 are not limited to the examples shown in FIG. 2A to 2C. For example, the direction of the arrow A1 can be changed depending on the relative positions of the grip portion 162 and the operation portion 163, the pivot direction of the grip portion 162, the push direction of the push switch serving as the lock portion 17, and the like. This also applies to the remaining arrows A2 to A4.

According to this arrangement, when the work machine 1 is set in the state shown in FIG. 1B, the power source 11 is not erroneously activated. Hence, the user can appropriately store the work machine 1. Hence, according to this embodiment, usability when storing the work machine 1 improves.

Note that the work machine 1 may be configured to be maintained in an erected posture at the time of storing. That is, for example, a predetermined support portion may be provided in the rear portion of the vehicle body 10 so that the extended portion 16 folded with respect to the vehicle body 10 can be set in a vertical posture. This can reduce the space needed to store the work machine 1.

In the embodiment, a lawn mower has been exemplified as the work machine 1. However, an example of the work machine 1 is not limited to this. That is, the contents of the embodiment can also be applied to a snow plow including an auger as the work portion 12, and can also be applied to an agricultural work machine such as a cultivator.

As has been described above, for the sake of facilitating understanding, each element is illustrated using a name associated with its function. However, each element is not limited to an element having the contents described in each embodiment as the main function, but may include an element having the contents described in each embodiment as an auxiliary function.

Features of the embodiment will be summarized below.

According to the first aspect, there is provided a work machine (for example, 1) comprising a power source (for example, 11) incorporated in a vehicle body (for example, 10), an extended portion (for example, 16) extended from the vehicle body to form a grip portion (for example, 162) and configured to be folded with respect to the vehicle body, a lock portion (for example, 17) provided to lock the extended portion when the extended portion is folded with respect to the vehicle body, and an activation suppressing portion (for example, 18) configured to suppress activation of the power source if the extended portion is locked by the lock portion. According to the first aspect, since the power source is not erroneously activated, the user can appropriately store the work machine. Hence, usability when storing the work machine improves.

In the second aspect, the work machine is further comprising a battery (for example, 14) configured to supply power to the power source, wherein the activation suppressing portion blocks a power supply path from the battery to the power source if the extended portion is locked by the lock portion. According to the second aspect, it is possible to appropriately prevent a situation in which the power source is erroneously activated.

In the third aspect, the work machine is further comprising a battery case (for example, 15) provided to be opened/closed with respect to the vehicle body and store the battery, wherein the activation suppressing portion sets the battery case in an open state if the extended portion is locked by the lock portion. According to the third aspect, it is possible to relatively easily extract the battery from the battery case.

In the fourth aspect, the activation suppressing portion ejects the battery from the battery case if the extended portion is locked by the lock portion. According to the fourth aspect, it is possible to appropriately prevent a situation in which the power source is erroneously activated.

In the fifth aspect, a gap (for example, S1) is provided between the vehicle body and the battery case, and the lock portion is provided on the battery case in the gap. According to the fifth aspect, it is possible to lock the extended portion by the lock portion when the extended portion is folded.

In the sixth aspect, the extended portion is provided such that a pair of left and right rod-shaped members (for example, 161) are extended from both lateral sides of the vehicle body, and the pair of left and right rod-shaped members are connected to each other at a position apart from the vehicle body to form the grip portion, and in a state in which the pair of left and right rod-shaped members are folded with respect to the vehicle body, the battery case is provided to be located between the pair of left and right rod-shaped members. According to the sixth aspect, it is possible to relatively easily extract the battery from the battery case.

In the seventh aspect, the extended portion includes an operation portion (for example, 163) as a portion that can be locked by the lock portion. According to the seventh aspect, it is possible to relatively easily lock the extended portion by the lock portion.

In the eighth aspect, the operation portion comprises a lever (for example, 163) provided to pivot with respect to the grip portion. According to the eighth aspect, it is possible to relatively easily lock the extended portion by the lock portion.

In the ninth aspect, the lock portion comprises a push switch (for example, 163). According to the ninth aspect, it is possible to implement suppression of activation of the power source by the activation suppressing portion by a relatively simple structure.

The invention is not limited to the foregoing embodiments, and various variations/changes are possible within the spirit of the invention.

What is claimed is:

1. A work machine comprising:
a power source incorporated in a vehicle body;
an extended portion extended from the vehicle body to form a grip portion and configured to be folded with respect to the vehicle body;
a lock portion provided to lock the extended portion when the extended portion is folded with respect to the vehicle body; and
an activation suppressing portion configured to suppress activation of the power source if the extended portion is locked by the lock portion;
a battery configured to supply power to the power source; and
a battery case provided to be opened/closed with respect to the vehicle body and store the battery,
wherein, in a case where the extended portion is locked by the lock portion, the activation suppressing portion sets the battery case in an open state and ejects the battery from the battery case.

2. The work machine according to claim 1,
wherein the activation suppressing portion blocks a power supply path from the battery to the power source by ejecting the battery from the battery case.

3. The work machine according to claim 1, wherein
a gap is provided between the vehicle body and the battery case, and
the lock portion is provided on the battery case in the gap.

4. The work machine according to claim 1, wherein
the extended portion is provided such that
a pair of left and right rod-shaped members are extended from both lateral sides of the vehicle body, and
the pair of left and right rod-shaped members are connected to each other at a position apart from the vehicle body to form the grip portion, and
in a state in which the pair of left and right rod-shaped members are folded with respect to the vehicle body, the battery case is provided to be located between the pair of left and right rod-shaped members.

5. The work machine according to claim 1, wherein the extended portion includes an operation portion as a portion that can be locked by the lock portion.

6. The work machine according to claim 5, wherein the operation portion comprises a lever provided to pivot with respect to the grip portion.

7. The work machine according to claim 1, wherein the lock portion comprises a push switch.

* * * * *